United States Patent
Löcken et al.

(10) Patent No.: US 6,953,822 B2
(45) Date of Patent: Oct. 11, 2005

(54) AQUEOUS (METH)ACRYLATE COPOLYMER DISPERSIONS, METHOD FOR PRODUCING THE SAME, AND THE USE THEREOF

(75) Inventors: Wilma Löcken, Haltern (DE); Heinz-Peter Rink, Münster (DE); Ursula Heimeier, Sendenhorst (DE)

(73) Assignee: BASF Coatings AG, Munster (DE)

( * ) Notice: Subject to any disclaimer, the term of this patent is extended or adjusted under 35 U.S.C. 154(b) by 264 days.

(21) Appl. No.: 10/220,823

(22) PCT Filed: Mar. 1, 2001

(86) PCT No.: PCT/EP01/02280

§ 371 (c)(1),
(2), (4) Date: Aug. 27, 2002

(87) PCT Pub. No.: WO01/64765

PCT Pub. Date: Sep. 7, 2001

(65) Prior Publication Data

US 2003/0069352 A1 Apr. 10, 2003

(30) Foreign Application Priority Data

Mar. 3, 2000 (DE) .................. 100 10 405

(51) Int. Cl.$^7$ .................................. C08F 2/16
(52) U.S. Cl. .............. 524/460; 524/534; 524/536
(58) Field of Search ................. 524/460, 534, 524/536

(56) References Cited

U.S. PATENT DOCUMENTS

| | | | | |
|---|---|---|---|---|
| 3,781,379 A | 12/1973 | Theodore et al. | ............ | 260/836 |
| 4,091,048 A | 5/1978 | Labana et al. | ............... | 260/836 |
| 4,181,642 A | 1/1980 | Holle et al. | .................... | 260/37 |
| 4,440,897 A | * 4/1984 | Maska | ......................... | 524/460 |
| 4,444,954 A | 4/1984 | Mels et al. | .................. | 525/124 |
| 4,482,721 A | 11/1984 | Wegner et al. | .............. | 548/262 |
| 4,489,135 A | 12/1984 | Drexler et al. | ........... | 428/423.1 |
| 4,710,542 A | 12/1987 | Forgiane et al. | ............. | 525/127 |
| 4,754,014 A | 6/1988 | Ryntz | .......................... | 528/28 |
| 4,895,910 A | 1/1990 | Isozaki et al. | ........... | 525/326.5 |
| 4,939,213 A | 7/1990 | Jacobs, III et al. | ...... | 525/329.9 |
| 5,051,473 A | 9/1991 | Tabuchi et al. | ............. | 525/100 |
| 5,055,524 A | 10/1991 | Pettit, Jr. et al. | ........... | 525/172 |
| 5,079,312 A | 1/1992 | Isozaki et al. | .............. | 525/479 |
| 5,084,541 A | 1/1992 | Jacobs, III et al. | ........... | 528/45 |
| 5,288,865 A | 2/1994 | Gupta | ......................... | 544/200 |
| 5,574,103 A | 11/1996 | Wu et al. | .................... | 525/127 |
| 5,691,419 A | 11/1997 | Engelke et al. | ............. | 525/208 |
| 5,691,425 A | 11/1997 | Klein et al. | ................. | 525/455 |
| 5,728,769 A | 3/1998 | Natesh et al. | ............... | 524/591 |
| 5,739,194 A | 4/1998 | Natesh et al. | ............... | 524/457 |
| 5,889,106 A | 3/1999 | Kurek et al. | ................. | 524/589 |
| 5,981,653 A | 11/1999 | Wilmes et al. | .............. | 524/839 |
| 6,001,424 A | 12/1999 | Lettmann et al. | ........ | 427/407.1 |
| 6,001,915 A | 12/1999 | Schwarte et al. | ........... | 524/457 |
| 6,291,579 B1 | 9/2001 | Kalck et al. | ................. | 524/832 |
| 6,309,707 B1 | 10/2001 | Mayer et al. | ............... | 427/386 |

FOREIGN PATENT DOCUMENTS

| | | | | |
|---|---|---|---|---|
| CA | 2073115 | 3/1992 | ......... | C09D/175/14 |
| CA | 2097010 | 5/1993 | ......... | C09D/133/04 |
| EP | 386325 | 11/1989 | ......... | C08F/265/00 |
| EP | 575931 | 6/1993 | ......... | C08F/265/06 |
| EP | 816402 | 6/1997 | ......... | C08F/220/02 |
| GB | 1538204 | 11/1976 | ............. | A61F/1/22 |
| WO | WO98/33831 | 8/1998 | ......... | C08F/291/00 |

* cited by examiner

Primary Examiner—Kriellion A. Sanders

(57) ABSTRACT

Aqueous (meth)acrylate copolymer dispersions preparable by
(I) subjecting at least one monomer (a) containing at least one hydrophilic functional group which brings about the water-solubility or water-dispersibility of the (meth) acrylate copolymer to (co)polymerization in aqueous/organic solution using at least one oil-soluble initiator which provides free radicals,
(II) where appropriate, fully or partly neutralizing the resulting (co)polymer I,
(III) dispersing the resultant solution of the (co)polymer I, (partly) neutralized where appropriate, in water, and
(IV) copolymerizing and/or graft-copolymerizing at least one monomer (b) in the presence of the resultant dispersion III using oil-soluble initiators which provide free radicals, the monomer or monomers (b)
containing at least one hydrophilic functional group which brings about no substantial water-solubility or water-dispersibility of the (meth)acrylate copolymer, or at least one hydrophobic group, and
being selected in nature and amount such that the resulting (meth)acrylate copolymer is soluble or dispersible in water.

10 Claims, No Drawings

AQUEOUS (METH)ACRYLATE COPOLYMER DISPERSIONS, METHOD FOR PRODUCING THE SAME, AND THE USE THEREOF

The present invention relates to novel aqueous (meth) acrylate copolymer dispersions. The present invention also relates to a novel process for preparing aqueous (meth) acrylate copolymer dispersions. The present invention further relates to the use of the novel aqueous (meth)acrylate copolymer dispersions for preparing novel coating materials, adhesives, and sealing compounds.

Aqueous (meth)acrylate copolymer dispersions prepared by (1) subjecting, in a first stage, monomers (a) which bring about the water-solubility or water-dispersibility of the copolymers prepared therewith and monomers (b) which are substantially hydrophobic to emulsion polymerization in water or in aqueous/organic solution using oil-soluble and water-soluble initiators which supply free radicals and neutralizing the resultant copolymer and (2) in a second stage, emulsion-copolymerizing substantially monomers (b) in the presence of the dispersion prepared in the first stage are known from German laid-open specification DE 196 25 773 A1 and from international patent application WO 98/49205. The known aqueous (meth)acrylate copolymer dispersions serve inter alia for preparing water-redispersible polymer powders or directly for use as binders in coating materials, adhesives, compression molding compounds, and moldings. They have the disadvantage, however, that they cannot always be prepared reliably with the low molecular weights which are of advantage in the field of coating materials. Binders with too high a molecular weight may in fact give rise to clearly visible defects in coatings. This proves to be a grave disadvantage in particular in the technologically and esthetically particularly challenging field of vehicle finishing, especially the OEM finishing of automobiles, since here defects in the coating are particularly unpleasant to the eye and are therefore not accepted at all by the manufacturers of motor vehicles and their customers.

It is an object of the present invention to provide novel (meth)acrylate copolymer dispersions which no longer have the disadvantages of the prior art but which instead comprise (meth)acrylate copolymers with an advantageously low molecular weight and allow the preparation of coating materials, adhesives, and sealing compounds which satisfy all of the requirements of the art. In particular, the novel coating materials ought to give visually flawless and defect-free coatings.

Found accordingly have been the novel aqueous (meth) acrylate copolymer dispersions preparable by (I) subjecting at least one monomer (a) containing at least one hydrophilic functional group which brings about the water-solubility or water-dispersibility of the (meth) acrylate copolymer to (co)polymerization in aqueous/ organic solution using at least one oil-soluble initiator which provides free radicals, (II) where appropriate, fully or partly neutralizing the resulting (co)polymer I, (III) dispersing the resultant solution of the (co)polymer I, (partly) neutralized where appropriate, in water, and (IV) copolymerizing and/or graft-copolymerizing at least one monomer (b) in the presence of the resultant dispersion III using oil-soluble initiators which provide free radicals, the monomer or monomers (b)

containing at least one hydrophilic functional group which brings about no substantial water-solubility or water-dispersibility of the (meth)acrylate copolymer, or at least one hydrophobic group, and being selected in nature and amount such that the resulting (meth)acrylate copolymer is soluble or dispersible in water.

The novel aqueous (meth)acrylate copolymer dispersions are referred to below for the sake of brevity as "dispersions of the invention".

Further subject matter of the invention will emerge upon reading the description.

The dispersions of the invention have a solids content which can be varied very widely, which is one of their particular advantages. Based in each case on the dispersion of the invention, the solids content is preferably from 10 to 70%, more preferably from 15 to 65%, with particular preference from 20 to 60%, with very particular preference from 25 to 55%, and in particular from 30 to 50% by weight. The pH of the dispersions of the invention is preferably from 7.0 to 9.0.

The water-soluble or water-dispersible (meth)acrylate copolymers which are present in the dispersions of the invention preferably have hydroxyl numbers of from 30 to 200, more preferably from 40 to 190, with particular preference from 50 to 180, with very particular preference from 60 to 170, with very particular preference from 70 to 160, and in particular from 80 to 150 mg KOH/g. Where the dispersions of the invention serve for preparing physically curing coating materials, adhesives, and sealing compounds of the invention, hydroxyl numbers lower than 30 mg KOH/g may also be employed.

The (meth)acrylate copolymers for use in accordance with the invention contain hydrophilic functional groups, which render them water-soluble or water-dispersible and which are introduced by the monomers (a) described below. The amount of hydrophilic functional groups may likewise vary very widely and is guided by the requirements of the case in hand. At the bottom end it is limited merely by the need to employ a sufficient number of hydrophilic functional groups that the (meth)acrylate copolymers for use in accordance with the invention are water-soluble or water-dispersible. At the top end it is limited by the consideration that the hydrophilic functional groups present must not reduce the water resistance of the coatings, adhesive films, and seals produced from the coating materials, adhesives, and sealing compounds of the invention. The hydrophilic functional groups are preferably employed in an amount of from 9 to 200 meq/100 g (meth)acrylate copolymer. Where acid groups or amino groups are employed as hydrophilic functional groups, this corresponds to acid numbers or amine numbers of from 5 to 112 mg KOH/g. Preference is given to using acid numbers or amine numbers of from 10 to 100, with particular preference from 12 to 80, with particular preference from 15 to 70, with very particular preference from 18 to 60, and in particular from 20 to 50 mg KOH/g.

The glass transition temperature of the (meth)acrylate copolymers for use in accordance with the invention may vary very widely and is guided primarily by the intended use of the dispersions of the invention. The skilled worker is able to set the optimum glass transition temperatures for the respective end use by way of the physical composition, i.e., the nature and amount, of the monomers detailed below, and in this context is able to calculate the glass transition temperatures approximately, in accordance with the formula of Fox:

$$1/Tg = \sum_{n=1}^{n=x} W_n/Tg_n; \sum_n W_n = 1 \qquad (I)$$

Tg=glass transition temperature of the polyacrylate resin $W_n$=weight fraction of the nth monomer $Tg_n$=glass transition temperature of the homopolymer of the nth monomer x=number of different monomers The glass transition temperatures preferably lie between −30 and 180, more preferably −20 and 160, with particular preference −10 and 140, with very particular preference 0 and 120, and in particular 10 and 100° C.

The number-average molecular weights of the (meth) acrylate copolymers for use in accordance with the invention may vary widely. It is preferred to set comparatively low number-average molecular weights, more preferably below 15 000 daltons, with very particular preference from 1 500 to 13 000 daltons, and in particular from 2 500 to 10 000 daltons. They preferably have a molecular weight polydispersity of from 2.5 to 15, in particular from 3.0 to 12.

The dispersions of the invention are preparable by subjecting in a first stage at least one monomer (a) containing at least one hydrophilic functional group which brings about the water-solubility or water-dispersibility of the (meth) acrylate copolymer to (co)polymerization in aqueous/organic solution using at least one oil-soluble initiator which provides free radicals.

In the context of the present invention, the property of being hydrophilic refers to the constitutional property of a molecule or functional group to penetrate the aqueous phase or to remain therein. Accordingly, for the purposes of the present invention, the property of being hydrophobic is the constitutional property of a molecule or functional group to behave exophilically with respect to water; in other words, they display a propensity not to penetrate water, or to depart the aqueous phase. For further details, refer to Römpp Lexikon Lacke und Druckfarben, Georg Thieme Verlag, Stuttgart, N.Y., 1998, "Hydrophilicity", "Hydrophobicity", pages 294 and 295.

Examples of highly suitable hydrophilic functional groups for use in accordance with the invention are acid groups such as carboxyl groups, sulfonic acid groups, phosphoric acid groups or phosphonic acid groups, preferably carboxyl groups and sulfonic acid groups, especially carboxyl groups, amino groups such as primary, secondary or tertiary amino groups, quaternary ammonium groups or phosphonium groups or ternary sulfonium groups or polyether groups of the general formula $R^1$—(O—$(CHR^2)_o$—$)_p$—, in which the substituent $R^2$=hydrogen or a lower, optionally substituted alkyl radical, the index o=2 to 6, preferably 3 to 4, and the index p=2 to 100, preferably 5 to 50, and in which the radical $R^1$ stands for a lower alkyl radical, particularly for methyl, ethyl, propyl, isopropyl, n-butyl, isobutyl, or tert-butyl. Particular suitability is possessed by methyl- ethyl- or propyl-poly(ethylene glycol), especially methyl-poly (ethylene glycol).

Examples of suitable monomers (a) for use in accordance with the invention are the monomers (a1), (a2) and (a3):

Examples of suitable monomers (a1) for use in accordance with the invention are acrylic acid, methacrylic acid, ethacrylic acid, crotonic acid, maleic acid and its monoesters, fumaric acid and its monoesters or itaconic acid and its monoesters; olefinically unsaturated sulfonic acids such as vinylbenzoic acid (all isomers), alpha-methylvinylbenzoic acid (all isomers), or p-vinylbenzenesulfonic acid or phosphonic acids or their partial esters or mono(meth) acryloyloxyethyl maleate, succinate or phthalate. Further examples of monomers (a1) containing acid groups are known from the laid-open specification DE 196 25 773 A1, column 2 line 58 to column 3 line 8, or from international patent application WO 98/49205, page 3 lines 23 to 34, the monomers (a1) being selected so that the profile of properties of the resultant (co)polymers is determined by the (meth)acrylate monomer or monomers.

Examples of suitable monomers (a2) for use in accordance with the invention are N,N-diethylamino-alpha-methylstyrene (all isomers), N,N-diethylaminostyrene (all isomers), allylamine, crotylamine, 2-amino- or 2-N-methyl-, 2-N,N-dimethyl-, 2-N-ethyl-, 2-N,N-di-ethyl-, 2-N-propyl-, 2-N,N-dipropyl-, 2-N-butyl-, 2-N,N-dibutyl-, 2-N-cyclohexyl- or 2-N,N-cyclohexyl-methyl-amino- or 2-N,N, N,N-tetramethylammonium- or 2-N,N-dimethyl-N,N-diethylammonium-, 2-tetramethyl-phosphonium- or 2-triethylsulfonium-ethyl acrylate, -ethyl methacrylate, -propyl acrylate or -propyl methacrylate or 3-amino- or 3-N-methyl-, 3-N,N-di-methyl-, 3-N-ethyl-, 3-N,N-diethyl-, 3-N-propyl-, 3-N,N-dipropyl-, 3-N-butyl-, 3-N,N-dibutyl-, 3-N-cyclohexyl- or 3-N,N-cyclohexyl-methyl-amino- or 3-N,N,N,N-tetramethylammonium- or 3-N,N-dimethyl-N, N-diethylammonium-, 3-tetramethylphosphonium- or 3-triethylsulfonium-propyl acrylate or -propyl methacrylate, the monomers (a2) preferably being selected so that the profile of properties of the resultant (co)polymers is determined by the (meth)acrylate monomer or monomers.

Examples of suitable monomers (a3) for use in accordance with the invention are methyl- ethyl- or propyl-poly (ethylene glycol) acrylate or methacrylate, especially methyl-poly(ethylene glycol) acrylate or methacrylate. Further examples of suitable monomers (a) of this kind are known from the laid-open specification DE 196 25 773 A1, column 3, line 65 to column 4 line 20.

The monomers (a1) or (a2) may be used together with the monomers (a3). The conjoint use of the monomers (a1) and (a2) is advisable only in exceptional cases, since there is a risk here of the formation of insoluble polyelectrolyte complexes. In the context of the present invention, the monomers (a1) have advantages and are therefore used with preference in accordance with the invention. Of these monomers (a1), the carboxyl-containing monomers, especially acrylic acid and methacrylic acid, are particularly advantageous and are therefore used with very particular preference in accordance with the invention.

In accordance with the invention, the monomer (a) or the monomers (a) may be copolymerized with at least one monomer (b) which contains at least one hydrophilic functional group which does not bring about any substantial water-solubility or water-dispersibility of the (meth)acrylate copolymer, or contains at least one hydrophobic group.

Examples of suitable hydrophilic functional groups which do not give rise to any substantial water-solubility or water-dispersibility are hydroxyl groups, amide groups, carbamate groups, epoxide groups or ureido groups.

Examples of suitable hydrophobic groups are alkyl groups or cycloalkyl groups.

Suitable for this purpose in accordance with the invention are all customary and known ethylenically unsaturated monomers other than the monomers (a). These monomers are selected in terms of nature and amount such that the profile of properties of the resultant copolymer is determined substantially by the (meth)acrylates and the (meth)acrylate copolymer for use in accordance with the invention remains water-soluble or water-dispersible.

Examples of suitable monomers (b) are b1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol (meth)acrylate or tert-butylcyclohexyl (meth)acrylate; these may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth) acrylate. For the purposes of the present invention, minor amounts of monomers of higher functionality in this case are to be understood as amounts which do not lead to crosslinking or gelling of the copolymers;

b2) substantially acid-group-free hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxy-methyl) cyclohexane, octahydro-4,7-methano-1H-indenedimethanol or methylpropanediol mono-acrylate, monomethacrylate, monoethacrylate, mono-crotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (b2) of higher functionality are concerned, the comments made above relating to the monomers (b1) of higher functionality apply analogously);

b3) vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, but especially Versatic® acids (cf. R ömpp Lexikon Lacke und Druckfarben, Georg Thieme Verlag, Stuttgart, N.Y., 1998, "Versatic® acids", pages 605 and 606).

b4) Reaction products of acrylic acid and/or methacrylic acid with the glycidyl ester of an alpha-branched monocarboxylic acid having from 5 to 18 carbon atoms per molecule, in particular a Versatic® acid, or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule, especially a Versatic® acid.

b5) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclo-pentadiene.

b6) amido-containing monomers such as (meth)-acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclo-hexyl-, N,N-cyclohexylmethyl- and/or N-methylol-, N,N-dimethylol-, N-methoxymethyl-, N,N-di(methoxy-methyl)-, N-ethoxymethyl- and/or N,N-di(ethoxy-ethyl)-(meth) acrylamide; monomers containing carbamate groups such as (meth)acryloyloxyethyl carbamate or (meth) acryloyloxypropyl carbamate; or monomers containing urea groups such as ureido acrylate or ureido methacrylate;

b7) monomers containing epoxide groups, such as the glycidyl ester of acrylic acid, methacrylic acid, ethacrylic acid, crotonic acid, maleic acid, fumaric acid and/or itaconic acid;

b8) vinylaromatic hydrocarbons such as styrene, vinyltoluene, diphenylethylene or alpha-alkylstyrenes, especially alpha-methylstyrene;

b9) nitriles such as acrylonitrile and/or meth-acrylonitrile.

b10) Vinyl compounds, especially vinyl halides and/or vinylidene dihalides such as vinyl chloride, vinyl fluoride, vinylidene dichloride or vinylidene difluoride; N-vinyl amides such as vinyl-N-methylformamide, N-vinylcaprolactam or N-vinyl-pyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethyl-heptanoic acid.

b11) Allyl compounds, especially allyl ethers and allyl esters such as allyl methyl, ethyl, propyl or butyl ether or allyl acetate, propionate or butyrate.

b12) Polysiloxane macromonomers having a number-average molecular weight Mn of from 1 000 to 40 000 and having on average from 0.5 to 2.5 ethylenically unsaturated double bonds per molecule; especially polysiloxane macromonomers having a number-average molecular weight Mn of from 2 000 to 20 000, with particular preference from 2 500 to 10 000 and, in particular, from 3 000 to 7 000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat.

No. 4,754,014 A1 in columns 5 to 9, in DE 44 21 823 A1 or in the international patent application WO 92/22615 on page 12 line 18 to page 18 line 10;
and/or b13) acryloyloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid (cf. monomers b2).

The above-described monomers (a) and, where appropriate, (b) are (co)polymerized in aqueous/organic solution.

The aqueous/organic solution for use in accordance with the invention comprises water and at least one water-soluble organic solvent or consists thereof. Examples of suitable water-soluble organic solvents are low molecular mass alcohols or diols such as methanol, ethanol, propanol, isopropanol, n-butanol, ethyl glycol or propyl glycol, ketones such as acetone or methyl ethyl ketone or amides such as N-methylpyrrolidone or N-dimethylformamide. As well as water and the organic solvents, the solution may also comprise additives, such as are customarily used for free-radical solution polymerization, such as molecular weight regulators such as, for example, dodecyl mercaptan. The solution may also include a portion of the initiators described below or a portion of the monomers (a) or, where appropriate, (b) for use in accordance with the invention, preferably from 30 to 50%. The weight ratio of organic solvent to water is preferably from 99:1 to 70:30. In accordance with the invention, the solution is used as the initial charge for the (co) polymerization.

For the (co)polymerization use is made in accordance with the invention of at least one oil-soluble initiator which provides free radicals. Examples of suitable initiators of this kind are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates such as bis(4-tert-butylcyclohexyl) peroxydicarbonate; azo initiators, examples being azodinitriles such as azobisiso-butyronitrile; or C-C-cleaving initiators such as benzpinacol silyl ethers. They are used preferably in an amount, based in each case on the monomers (a) and, where appropriate (b), of from 0.1 to 25%, more preferably from 0.2 to 20%, with particular preference 0.3 to 15%, with very particular preference from 0.5 to 13%, and in particular from 0.6 to 12% by weight.

Where monomers (b) are used in the first process step, it is of advantage in accordance with the invention if the monomer or monomers (a) on the one hand and the monomer or monomers (b) on the other hand are metered into the aqueous/organic solution (initial charge) by way of separate feeds.

Viewed in terms of method, the solution (co) polymerization has no particular features but is instead conducted preferably at temperatures from 50 to 200° C., more preferably from 55 to 180° C., with particular preference from 60 to 160° C., with particular preference from 65 to 140° C., with very particular preference from 70 to 120° C., and in particular from 75 to 100° C., where appropriate under pressure.

Suitable reactors for the (co)polymerization processes include the customary and known stirred tanks, stirred tank cascades, tube reactors, loop reactors or Taylor reactors, as described, for example, in patents DE 1 071 241 B1, DE 198 28 742 A1 or EP 0 498 583 A1 or in the article by K. Kataoka in Chemical Engineering Science, Volume 50, No. 9, 1995, pages 1409 to 1416. The free-radical copolymerization is preferably conducted in stirred vessels or Taylor reactors, the Taylor reactors being configured such that the conditions of Taylor flow are met over the entire length of the reactor, even if the kinematic viscosity of the reaction medium changes sharply—in particular, increases—as a result of the copolymerization.

The number-average molecular weight of the (co) polymers resulting in the first process step may vary very widely and is preferably well below 10 000 daltons. More preferably it is from 1 000 to 9 000, with particular preference from 1 500 to 8 500, with very particular preference 2 000 to 8 000, and in particular from 2 500 to 7 500 daltons. The polydispersity is preferably comparatively low. It is more preferably below 6.0, with particular preference 5.0, with very particular preference 4.0, and in particular 3.0.

In accordance with the invention, when using the above-described monomers (a1) or the monomers (a2) which contain primary, secondary or tertiary amino groups, the resulting (co)polymer is partly or fully neutralized in the second process step. Preference is given to partial neutralization, the degree of neutralization being in particular from 70 to 80 mol %. If use is made exclusively of monomers (a2) containing quaternary ammonium groups or phosphonium groups or ternary sulfonium groups, or of monomers (a3), neutralization is superfluous.

Examples of suitable neutralizing agents for monomers (a1) are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine or triethanolamine, for example, Examples of suitable neutralizing agents for monomers (a2) are inorganic and organic acids such as sulfuric acid, hydrochloric acid, phosphoric acid, formic acid, acetic acid, lactic acid, dimethylolpropionic acid or citric acid.

In the third process step, in accordance with the invention, the above-described solution of the (co)polymer is dispersed in water. It is preferred to employ an amount of water such that the resulting dispersions has a solids content of from 10 to 70%, more preferably from 15 to 65%, with particular preference from 20 to 60%, with very particular preference from 25 to 55%, and in particular from 30 to 50% by weight.

In the fourth process step, in accordance with the invention, at least one of the above-described monomers (b) is (co)polymerized in the presence of the above-described dispersion using the above-described, oil-soluble initiators which provide free radicals. In this case the monomer or monomers (b) are selected in terms of nature and amount such that the resultant (meth)acrylate copolymer for use in accordance with the invention is soluble or dispersible in water. The amount of the monomers (b) is therefore guided primarily by the amount of the monomers (a) used in the first process step. Accordingly, in the fourth process step the quantity of monomers (b) incorporated by copolymerization must not be so great that the amount of the hydrophilic functional groups incorporated by the monomers (a) is no longer sufficient to render the (meth)acrylate copolymers for use in accordance with the invention soluble or dispersible. The skilled worker is therefore able to specify the optimum amount of monomers (b) for the particular case in hand on the basis of his or her general art knowledge, where appropriate with the assistance of simple range finding tests.

The resultant (meth)acrylate copolymers for use in accordance with the invention are graft copolymers and/or (co)

polymers which are present in a mixture with the (co)polymers of the first process step. Critical to the fraction of the graft copolymers is the grafting activity of the monomers (b) employed in the fourth process step, on the one hand, and the number with the active grafting centers in the (co)polymers. Irrespective of whether the (meth)acrylate copolymer for use in accordance with the invention comprises graft copolymers or (co)polymers, it is essential above all for the dispersion of the invention that the amounts of monomers (a) and monomers (b) have been balanced in the manner described above.

Viewed in terms of method, the (co)polymerization and/or graft copolymerization of the fourth process step has no special features; instead, the above-described reaction conditions and apparatus are used.

The dispersions of the invention serve for preparing the coating materials, adhesives, and sealing compounds of the invention or are used directly as such, which is a substantial advantage of the dispersions of the invention.

They are preferably used as coating materials of the invention, with particular preference as surfacers, solid-color topcoat materials, aqueous basecoat materials, and clearcoat materials for producing single-coat or multicoat, color and/or effect paint systems on primed and unprimed substrates by, for example, the wet-on-wet technique (cf. European patent applications EP 0 089 497 A1). For these end uses the primary dispersions of the invention may be admixed before, during and/or after their preparation with at least one customary and known coatings additive in effective amounts. In this context, before or during the preparation of the dispersions of the invention, the only coatings additives added are those which do not disrupt, let alone inhibit completely, the (co)polymerization and/or graft copolymerization. The skilled worker will be able to identify such coatings additives on the basis of his or her general art knowledge. Said coatings additives are preferably added to the dispersion of the invention following its preparation.

The coating materials of the invention are physically curing. Physical curing generally requires no crosslinking agents but instead takes place by loss of solvent from the applied film. Linking takes place in this case by looping between the polymer molecules, whose molecular weight does not change in the process. Physical curing may also take place by the coalescence of binder particles, as is frequently the case with dispersions (cf. Römpp Lexikon Lacke und Druckfarben, Georg Thieme Verlag, Stuttgart, N.Y., 1998, pages 274 and 275: "Curing").

The coating materials of the invention may also be thermosetting. In that case they are self-crosslinking or externally crosslinking. In the context of the present invention, the term "self-crosslinking" refers to the capacity of a binder to undergo crosslinking reactions with itself. A prerequisite for this is that the binders already contain both kinds of complementary reactive functional groups which are necessary for crosslinking. The term externally crosslinking, on the other hand, refers to those coating materials in which one kind of the complementary reactive functional groups is present in the binder and the other kind in a curing or crosslinking agent—where such an agent is used in the present case. For further details, refer to Römpp Lexikon Lacke und Druckfarben, Georg Thieme Verlag, Stuttgart, N.Y., 1998, "Curing", pages 274 to 276, especially the bottom of page 275.

Examples of suitable complementary reactive functional groups for thermal curing are compiled in the following overview. In the overview, the variable R stands for an acyclic or cyclic aliphatic radical, an aromatic radical and/or an aromatic-aliphatic (araliphatic) radical; the variables R' and R" stand for identical or different aliphatic radicals or are linked with one another to form an aliphatic or heteroaliphatic ring.

OVERVIEW: EXAMPLES OF COMPLEMENTARY FUNCTIONAL GROUPS

| Binder and crosslinking agent or Crosslinking agent and binder | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |
| >NH | —CH$_2$—O—R |
| | —NH—CH$_2$—OH |
| | —NH—CH$_2$—O—R |
| | —N(—CH$_2$—O—R)$_2$ |
| | —NH—C(O)—CH(—C(O)OR)$_2$ |
| | —NH—C(O)—CH(—C(O)OR) (—C(O)—R) |
| | —NH—C(O)—NR'R" |
| | =Si(OR)$_2$ |
| | O |
| | —CH—CH$_2$ |
| —C(O)—OH | O |
| | —CH—CH$_2$ |
| | —C(O)—N(CH$_2$—CH$_2$—OH)$_2$ |

The selection of the respective complementary groups is guided on the one hand by the consideration that they must not disrupt or inhibit any additional curing with actinic radiation where appropriate and/or must not undergo any unwanted reactions during the storage and applications of the coating material, and on the other hand by the temperature range within which crosslinking is to take place.

In the case of the thermally curable coating materials it is possible to employ crosslinking temperatures of from 90 to 200° C. In these cases, in the binders it is preferred to employ thio, hydroxyl, methylol, methylol ether, N-methylol N-alkoxymethylamino, imino, carbamate, allophanate and/or carboxyl groups, but especially carboxyl groups or hydroxyl groups, specifically hydroxyl groups, on the one hand and, in the crosslinking agents, anhydride, carboxyl, epoxy, blocked isocyanate, urethane, methylol, methylol ether, N-methylol N-alkoxymethylamino, siloxane, amino, hydroxyl and/or beta-hydroxyalkylamide groups, but especially blocked isocyanate groups or epoxy groups, on the other. For the preparation of self-crosslinking binders, it is preferred to use methylol, methylol ether, N-methylol or N-alkoxymethylamino groups.

Examples of suitable crosslinking agents or amino resins, as described for example in Römpp Lexikon Lacke und Druckfarben, Georg Thieme Verlag, 1998, page 29, "Amino resins", in the textbook "Lackadditive" [Additives for Coatings] by Johan Bieleman, Wiley-VCH, Weinheim, N.Y., 1998, pages 242 ff., in the book "Paints, Coatings and Solvents", second completely revised edition, edited by D. Stoye and W. Freitag, Wiley-VCH, Weinheim, N.Y., 1998, pages 80 ff., in patents U.S. Pat. No. 4,710,542 A1 or EP-B-0 245 700 A1, and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207; carboxyl-containing compounds or resins, as described for example in patent DE 196

52 813 A1; compounds or resins containing epoxide groups, as described for example in patents EP 0 299 420 A1, DE 22 14 650 B1, DE 27 49 576 B1, U.S. Pat. Nos. 4,091,048 A1 or 3,781,379 A1; blocked polyisocyanates, as described for example in patents U.S. Pat. No. 4,444,954 A1, DE 196 17 086 A1, DE 196 31 269 A1, EP 0 004 571 A1 or EP 0 582 051 A1; and/or tris(alkoxycarbonylamino)-triazines, as described in patents U.S. Pat. Nos. 4,939,213 A1, 5,084,541 A1, 5,288,865 A1 or EP 0 604 922 A1.

It is also possible, however, to employ crosslinking temperatures from room temperature to 90° C. In these cases the binders preferably contain hydroxyl groups and the crosslinking agents nonblocked isocyanate groups. Examples of suitable crosslinking agents are therefore polyisocyanates, such as polyisocyanates containing isocyanurate, biuret, allophanate, imino-oxadiazinedone, urethane, urea and/or uretdione groups. Polyisocyanates containing urethane groups, for example, are obtained by reacting some of the isocyanate groups with polyols, such as trimethylol-propane and glycerol, for example. It is preferred to use aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate, diisocyanates derived from dimer fatty acids, as sold under the commercial designation DDI 1410 by Henkel and described in patents WO 97/49745 and WO 97/49747, especially 2-heptyl-3,4-bis(9-isocyanatononyl)-1-pentylcyclo-hexane; or 1,2-, 1,4- or 1,3-bis(isocyanato-methyl)cyclohexane, 1,2-, 1,4- or 1,3-bis(2-iso-cyanatoethy-1-yl)cyclohexane, 1,3-bis(3-isocyanatoprop-1-yl)cyclohexane or 1,2-, 1,4- or 1,3-bis(4-iso-cyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)-cyclohexane, or mixtures of these polyisocyanates. Very particular preference is given to using mixtures of polyisocyanates which contain uretdione and/or isocyanurate groups and/or allophanate groups and are based on hexamethylene diisocyanate, such as are formed by catalytic oligomerization of hexamethylene diisocyanate using appropriate catalysts.

Moreover, the coating materials can be cured thermally and with actinic radiation, which is referred to by those in the art as "dual cure". In the context of the present invention, actinic radiation means electromagnetic radiation, such as visible light, UV radiation or X-rays, especially UV radiation, and corpuscular radiation such as electron beams.

The dual-cure coating materials comprise at least one additive such as reactive diluents (cf. Römpp Lexikon Lacke und Druckfarben, Georg Thieme Verlag, Stuttgart, N.Y., 1998, page 491: "Reactive Diluents") or the additional binders described below. They contain groups which contain at least one bond which can be activated with actinic radiation. This bond becomes reactive on exposure to actinic radiation and enters together with other activated bonds of its kind into polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single or double bonds. Of these, the carbon-carbon double bonds are particularly advantageous and are therefore used with very particular preference in accordance with the invention. For the sake of brevity they are referred to as "double bonds".

Especially suitable double bonds are present, for example, in (meth)acrylate, ethacrylate, crotonate, cinnamate, vinyl ether, vinyl ester, dicyclo-pentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups. Of these, the acrylate groups offer very particular advantages and so are used with particular preference.

Crosslinking with actinic radiation may also be initiated or accelerated with suitable photoinitiators as further additives (cf. Römpp Lexikon Lacke und Druckfarben, Georg Thieme Verlag, Stuttgart, N.Y., 1998, pages 444 to 446: "Photoinitiators").

The coating materials of the invention may be one-component (1K) systems.

In the context of the present invention, a one-component (1K) system is a coating material which cures thermally or thermally and with actinic radiation and in which the binder and the crosslinking agent are present alongside one another, i.e., in one component. A precondition for this is that the two constituents crosslink with one another only at relatively high temperatures and/or on exposure to actinic radiation.

The coating materials of the invention may further be a two-component (2K) or multicomponent (3K, 4K) system.

In the context of the present invention, this is a coating material where in particular the binder and the crosslinking agent are present separately from one another in at least two components which are not combined until shortly before application. This form is chosen when binder and crosslinking agent react with one another even at room temperature, such as, for instance, the polyisocyanates with the hydroxyl-containing binders.

Suitable additives for the coating materials of the invention described above further include customary and known coatings additives.

Examples of suitable coatings additives are pigments, as described in Römpp Lexikon Lacke und Druckfarben, Georg Thieme Verlag, 1998, pages 176, "Effect Pigments"; pages 380 and 381 "Metal Oxide-Mica Pigments" to "Metal Pigments"; pages 180 and 181, "Iron Blue Pigments" to "Black Iron Oxide"; pages 451 to 453, "Pigments" to "Pigment Volume Concentration"; page 563, "Thioindigo Pigments"; and page 567, "Titanium Dioxide Pigments". These additives are used if the coating materials of the invention are used as surfacers, solid-color topcoat materials or aqueous basecoat materials, but especially as aqueous basecoat materials as part of what is known as the wet-on-wet technique (cf., for example, European patent EP 0 089 497 A1) for producing multicoat color and/or effect paint systems. They are naturally emitted if the coating materials of the invention are used as clearcoat materials, for example, as part of the wet-on-wet technique.

Further examples of suitable coatings additives which may be used both in the pigmented coating materials and in the unpigmented coating materials are additional binders such as oligomeric and polymeric, linear and/or branched and/or block, comb and/or random addition (co)polymers of ethylenically unsaturated monomers, or polyaddition resins and/or polycondensation resins, which are curable thermally and/or with actinic radiation, as are described in Römpp Lexikon Lacke und Druckfarben, Georg Thieme Verlag, Stuttgart, N.Y., 1998, page 457: "Polyaddition" and "Polyaddition Resins (Polyadducts)", pages 463 and 464: "Polycondensates", "Polycondensation" and "Polycondensation Resins", and also pages 73 and 74: "Binders". Further examples of suitable additional binders are the poly(meth)

acrylates or acrylate copolymers described in patent DE 197 36 535 A1, polyesters, especially those described in patents DE 40 09 858 A1 or DE 44 37 535 A1, alkyds, acrylated polyesters, polylactones, poly-carbonates, polyethers, epoxy resin-amine adducts, (meth)acrylatediols, partially saponified polyvinyl esters, polyurethanes and acrylated polyurethanes, such as those described in patents EP 0 521 928 A1, EP 0 522 420 A1, EP 0 522 419 A1, EP 0 730 613 A1 or DE 44 37 535 A1, or polyureas.

Further examples of suitable coatings additives are organic and inorganic fillers, thermally curable reactive diluents, low-boiling and/or high-boiling organic solvents ("long solvents"), UV absorbers, light stabilizers, free-radical scavengers, thermolabile free-radical initiators, aqueous dispersions of cocrosslinking agents, crosslinking catalysts, devolatilizers, slip additives, polymerization inhibitors, defoamers, emulsifiers, wetting agents, adhesion promoters, leveling agents, film-forming auxiliaries, rheology control additives, biocides such as silver salts or flame retardants. Further examples of suitable coatings additives are described in the textbook "Lackadditive" by Johan Bieleman, Wiley-VCH, Weinheim, N.Y., 1998.

The above-described crosslinking agents and coatings additives may also be present in the adhesives and sealing compounds of the invention, provided they are suitable for these end applications, something which the skilled worker is able to determine on the basis of his or her general art knowledge.

In terms of method the application of the coating materials of the invention has no special features but may instead take place by any customary application method, such as spraying, knifecoating, brushing, flow coating, dipping, trickling or rolling, for example. Preference is given to employing spray application methods, such as compressed air spraying, airless spraying, high-speed rotation, electrostatic spray application (ESTA), alone or in conjunction with hot spray application such as hot air spraying, for example.

Suitable substrates include all surfaces to be coated which are not damaged by curing of the coatings present thereon using heat and/or actinic radiation; examples include metals, plastics, wood, ceramic, stone, textile, fiber composites, leather, glass, glass fibers, glasswool and rockwool, mineral-bound and resin-bound building materials, such as plasterboard and cement slabs or roofing shingles, and also composites of these materials. Accordingly, the coating material of the invention is suitable for applications outside of automotive finishing as well. In that context it is particularly suitable as an architectural coating material for the interior and exterior, for the coating of furniture and for industrial coating, including coil coating, container coating, and the impregnation or coating of electrical components. In the context of the industrial coatings it is suitable for coating virtually all parts for private or industrial use such as radiators, domestic appliances, small metal parts such as nuts and bolts, hubcaps, wheel rims, packaging or electrical components such as motor windings or transformer windings.

In the case of electrically conductive substrates it is possible to use primers, which are produced conventionally from electrodeposition coating materials (electrocoat materials). Both anodic and cathodic electrocoat materials are suitable for this purpose, but especially cathodics.

It is also possible to coat, bond or seal primed or unprimed plastics parts made, for example, from ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728T1). Unfunctionalized and/or a polar substrate surfaces may be subjected prior to coating in a known manner to a pretreatment, such as with a plasma or by flaming, or provided with a hydroprimer.

The curing of the applied coating materials of the invention as well has no special features in terms of method but instead takes place in accordance with the customary and known thermal methods such as heating in a forced-air oven or irradiating using IR lamps, which in the case of dual cure may be supplemented further by exposure to actinic radiation. In that case it is possible to employ radiation sources such as high-pressure or low-pressure mercury vapor lamps, with or without lead doping, in order to open a radiation window of up to 405 nm, or electron beam sources.

The resulting coatings of the invention, especially the single-coat or multicoat color and/or effect paint systems and clearcoats of the invention, are easy to produce and, even under extreme climatic conditions, have outstanding visible properties and a very high chemical and weathering stability. They can therefore be used both in the interior and in the exterior.

The adhesive films and seals of the invention produced from the adhesives and sealing compounds of the invention have an outstanding bond strength and sealing capacity even under extreme climatic conditions and even over long periods of time. Moreover, they can be used in the interior sector and in the exterior sector.

Accordingly, the primed and unprimed substrates of the invention, especially buildings, bodies of automobiles and commercial vehicles, industrial components, including plastics parts, packaging, coils, and electrical components, or furniture, which have been coated with at least one coating of the invention, sealed with at least one seal of the invention and/or bonded with at least one adhesive of the invention are also notable for particular technical and economic advantages, in particular a long service life, which makes them particularly attractive to users.

EXAMPLE

The Preparation of an Inventive Dispersion

A stainless steel reactor equipped with stirrer, reflux condenser and two feed vessels for the monomers and one feed vessel for the initiator was charged with 4 843 parts by weight of propyl glycol and 1 207 parts by weight of water and this initial charge was heated to 90° C.

Thereafter a solution of 1 943 parts by weight of propyl glycol and 916 parts by weight of tert-butyl peroxy-2-ethylhexanoate was metered in at a uniform rate over the course of three hours.

15 minutes after the beginning of the initiator feed, the metered addition of the monomers was commenced. The first monomer feed was composed of 5 648 parts by weight of styrene, 2 294 parts by weight of methyl methacrylate, 1 318 parts by weight of methacrylester 13 and 1 703 parts by weight of n-butyl methacrylate. The second monomer feed was composed of 3 680 parts by weight of hydroxyethyl methacrylate, 1 540 parts by weight of acrylic acid and 1 712 parts by weight of water. Both monomer feeds were metered in at a uniform rate over the course of 2.5 hours. During the copolymerization the temperature was held at 90° C.

After the end of the feeds, polymerization was continued for two hours.

The resulting acrylate solution had a theoretical solids content of 63.8% by weight. The copolymer present therein had a theoretical acid number of 70 mg KOH/g, a number-average molecular weight of 6 802 daltons and a weight-average molecular weight of 14 248 daltons.

The acrylate solution was neutralized with 1 523 parts by weight of dimethylethanolamine at 80° C. for 45 minutes. 30 minutes after the end of the neutralization the solution was admixed over the course of 2.5 hours with 47 865 parts by weight of water by way of a feed vessel, the temperature slowly being lowered to 70° C. Thereafter the dispersion was homogenized for one hour. Its theoretical solids content was 24.5% by weight.

For the second stage of the copolymerization and/or graft copolymerization, a mixture of 1 147 parts by weight of tert-butyl peroxy-2-ethylhexanoate and 2 431 parts by weight of propyl glycol was metered into the dispersion at a uniform rate over the course of 3.5 hours via a feed vessel. 15 minutes after the beginning of the initiator feed the metered addition of a mixture of 8 140 parts by weight of styrene, 1 618 parts by weight of methyl methacrylate, 152 parts by weight of glycidyl methacrylate, 3 654 parts by weight of n-butyl methacrylate and 6 666 parts by weight of hydroxyethyl methacrylate was commenced; the feed was metered in at a uniform rate over the course of 3.5 hours. The polymerization temperature was 80° C. After the end of the feeds, polymerization was continued for two hours.

The resultant dispersion of the invention had a theoretical solids content of 40% by weight, a theoretical acid number of 30 mg KOH/g, a theoretical hydroxyl number of 112 mg KOH/g, a pH of 8.3, a solvent content of 9.2% by weight, a water content of 50.8% by weight and a viscosity of 1.6 dpas. The copolymer and/or graft copolymer present therein had a number-average molecular weight of 9 220 daltons and a mass-average molecular weight of 92 703 daltons (Mw/Mn=10.06).

The dispersion of the invention was outstandingly suitable for preparing coating materials, adhesives, sealing compounds, but especially suitable for preparing aqueous surfacers, solid-color topcoat materials, aqueous basecoat materials, and clearcoat materials.

What is claimed is:

1. Aqueous (meth)acrylate copolymer dispersions preparable by
   (I) subjecting at least one monomer (a) containing at least one hydrophilic functional group which brings about the water-solubility or water-dispersibility of the (meth)acrylate copolymer to (co)polymerization in aqueous/organic solution using at least one oil-soluble free-radical initiator,
   (II) where appropriate, at least partly neutralizing the resulting (co)polymer of step I,
   (III) dispersing the resultant solution of the (co)polymer of step I, at least partly neutralized where appropriate, in water, and
   (IV) graft copolymerizing or both copolymerizing and graft-copolymerizing at least one monomer (b) in the presence of the resultant dispersion of step III or aqueous solution of step I using at least one oil-soluble, free radical initiator,
   wherein the monomer or monomers (b)
      contain at least one hydrophilic functional group which brings about no substantial water-solubility or water-dispersibility of the (meth)acrylate copolymer, or at least one hydrophobic group, and
      is or are selected in nature and amount such that the resulting (meth)acrylate copolymer is soluble or dispersible in water,
   wherein the (meth)acrylate copolymer has a number average molecular weight from 1,500 to 15,000 daltons.

2. Aqueous (meth)acrylate copolymer dispersions of claim 1, wherein in process step I at least one monomer (a) and at least one monomer (b) are copolymerized.

3. Aqueous (meth)acrylate copolymer dispersions of claim 2, wherein in process step I the monomer or the monomers (a) and the monomer or the monomers (b) are metered into the aqueous/organic solution by way of separate feeds.

4. A composition comprising an aqueous (meth)acrylate copolymer dispersions of claim 1, wherein the composition is a member selected from the group consisting of coating materials, adhesives, and sealing compounds, and wherein said composition is curable by at least one method selected form the group consisting of physical curing, thermally curing, curing with actinic radiation, and combinations thereof.

5. A composition according to claim 4, further comprising at least one crosslinking agent or thermal crosslinking, at least one additive, or both.

6. A composition according to claim 4, further comprising at least one constituent containing in the molecule at least one bond which can be activated with actinic radiation.

7. Aqueous (meth)acrylate copolymer dispersions of claim 1, wherein in process step I at least one monomer (a) and at least one monomer (b) are copolymerized.

8. A composition comprising an aqueous (meth)acrylate copolymer dispersion of claim 2, wherein the composition is a member selected from the group consisting of coating materials, adhesives, and sealing compounds, and wherein said composition is curable by at least one method selected form the group consisting of physical curing, thermal curing, curing with actinic radiation, and combinations thereof.

9. A composition comprising an aqueous (meth)acrylate copolymer dispersion of claim 3, wherein the composition is a member selected from the group consisting of coating materials, adhesives, and sealing compounds, and wherein said composition is curable by at least one method selected form the group consisting of physical curing, thermal curing, curing with actinic radiation, and combinations thereof.

10. A composition according to claim 5, further comprising at least one constituent containing in the molecule at least one bond which can be activated with actinic radiation.

* * * * *